United States Patent [19]

Whiteside

[11] Patent Number: 5,324,382
[45] Date of Patent: Jun. 28, 1994

[54] APPARATUS FOR FORMING SYNTHETIC-PLASTIC-COVERED EXTERIOR BUILDING SIDING

[75] Inventor: Robert C. Whiteside, Harrison, Mich.

[73] Assignee: Citadel Architectural Products, Federal Way, Wash.

[21] Appl. No.: 5,017

[22] Filed: Jan. 15, 1993

Related U.S. Application Data

[62] Division of Ser. No. 745,748, Aug. 16, 1991, Pat. No. 5,201,981.

[51] Int. Cl.[5] ............................................. B32B 31/26
[52] U.S. Cl. .................................... 156/359; 156/378; 156/382; 156/475; 156/484; 156/494; 156/499
[58] Field of Search ............... 156/382, 212, 475, 483, 156/484, 494, 499, 359, 216, 213, 285, 286, 378; 425/388; 52/309.15

[56] References Cited

U.S. PATENT DOCUMENTS

| | | |
|---|---|---|
| 2,277,752 | 3/1942 | Frey . |
| 3,130,101 | 4/1964 | Gittins et al. ........................ 156/285 |
| 3,149,018 | 9/1964 | Jacobson ............................. 156/213 |
| 3,186,895 | 6/1965 | MacDonald ......................... 156/285 |
| 3,350,257 | 10/1967 | Hourigan et al. . |
| 3,408,786 | 11/1968 | Snyker . |
| 3,654,012 | 4/1972 | Schlager ............................. 156/286 |
| 3,866,378 | 2/1975 | Kessler . |
| 4,009,981 | 3/1977 | Rosen ................................. 425/388 |
| 4,146,662 | 3/1979 | Eggers et al. . |
| 4,478,415 | 10/1984 | Shaffer et al. . |
| 4,668,175 | 5/1987 | Martin ................................ 425/388 |
| 4,769,100 | 9/1988 | Short et al. ......................... 156/212 |
| 4,788,808 | 12/1988 | Slocum . |
| 5,051,144 | 9/1991 | Kistner .............................. 156/213 |
| 5,080,742 | 1/1992 | Takahashi ........................... 156/212 |
| 5,125,994 | 6/1992 | Harasta et al. ..................... 151/212 |

FOREIGN PATENT DOCUMENTS

| | | | |
|---|---|---|---|
| 570868 | 7/1981 | Italy .................................. 156/285 |
| 53-43772 | 4/1978 | Japan ................................ 156/475 |
| 54058776 | 11/1982 | Japan ................................ 156/212 |
| 57046848 | 2/1984 | Japan ................................ 156/212 |
| 2056903 | 3/1985 | United Kingdom ............... 156/285 |

Primary Examiner—Jeff H. Aftergut
Assistant Examiner—Michele K. Yoder
Attorney, Agent, or Firm—Learman & McCulloch

[57] ABSTRACT

A method and apparatus for forming a plastic film-protected external siding board in a molding press having an upper normally closed heating box open at its lower end, and a support system below the upper box which supports a board core with a plastic film draped over it to project beyond its side and end edges. The upper clamp box and film are brought into engagement to close the heating chamber with the film which is then billowed upwardly in the heating chamber to prevent it from sagging while heat is applied to raise the film to molding temperature. A differential pressure is then applied to the film to mold it to the core.

9 Claims, 7 Drawing Sheets

APPARATUS FOR FORMING SYNTHETIC-PLASTIC-COVERED EXTERIOR BUILDING SIDING

This is a divisional of copending application(s) U.S. patent application Ser. No. 07/745,748 filed Aug. 16, 1991 now U.S. Pat. No. 5,201,981.

BACKGROUND OF THE INVENTION

It has previously been proposed to provide an exterior building siding of laminate construction wherein a wood core is coated with a protective layer of a Colored synthetic plastic material such as polyvinyl chloride. It has also been proposed to provide a building siding in which a thin synthetic plastic sheet is bonded to the outer surface of a rigid foam plastic layer which in turn is bonded to the outer surface of the core panel. Patents of this character are part of the following list of prior art patents which I incorporate by reference herein.

| | |
|---|---|
| 2,277,752 | Frey |
| 3,350,257 | Hourigan et al |
| 3,408,786 | Snyker |
| 3,866,378 | Kessler |
| 4,146,662 | Eggers et al |
| 4,478,415 | Shaffer et al |
| 4,788,808 | Slocum |

In these prior art patents, the plastic outer faces have been either applied in the form of a coating or bonded film which was not, first of all, molded to the configuration of the core. To my knowledge, no one has successfully commercially formed such a product by molding a sheet or film of synthetic plastic to the precise shape of the core, utilizing the core as the mold surface, and differential pressure drawing the plastic sheet to the core with such definition that the grain of the board is defined in the plastic outer covering.

SUMMARY OF THE INVENTION

The present invention provides a plastic covered exterior building siding surface which is in intimate contact with the core material of the siding, and which is intimately bonded thereto. The product is formed by a differential pressure method in which a plastic film or sheet is draped over the board to be covered and then is drawn upwardly from the board and heated to a predetermined degree to render it moldable. A platen is then raised through the opening in an intermediate clamp frame to engage the lower surface of the siding and vacuum is applied to the siding via passages in the platen at the same time that pressure is being exerted on the plastic from above. The plastic is drawn tightly down on the siding and conforms intimately to the face and side edges thereof. Afterward, to form a completely enveloped product, the plastic sheet is trimmed to remove the portions adhering to the side edges and turned upside down so that its opposite face and side edges are now exposed to a second plastic sheet which is draped over the partially constructed product. The differential pressure forming procedure is then repeated to force the heated plastic sheet down into intimate contact with the exposed face and exposed side and end edges of the partially formed product. After cooling, the product is removed from the differential pressure forming press and the side edges of the plastic film are trimmed to abut the side edges of the plastic film already adhered to the product. A product formed in this manner will greatly increase the life of such building panels and eliminate the need for double coat painting the product every three years or so. For example, the product may have a twenty year life before some maintenance is necessary, because no peeling occurs and no significant moisture reaches the core wood through the moisture resistant, weather proof plastic covering.

It is a prime object of the present invention to provide a method of fashioning a water and warp resistant siding which can be factory finished in a very economic manner using mass production techniques to provide a product of greatly enhanced quality Which is virtually trouble free and needs no maintenance.

Another object of the invention is to provide a highly durable product in which uniformity of size and color can be reliably achieved.

Still another object of the invention is to provide a very attractive product of the character described in which there is no wrinkling of the plastic film, which intimately adheres to the core in such a manner that the plastic covering film takes on the configuration of the grain of the core.

Other objects and advantages of the invention will be pointed out specifically or will become apparent from the following description when it is considered in conjunction with the appended claims and the accompanying drawings.

THE DRAWINGS

In the drawings, FIG. 1 is a sectional side elevational view with a substrate siding in initial position and the plastic film being shown draped thereover.

Figure 8:
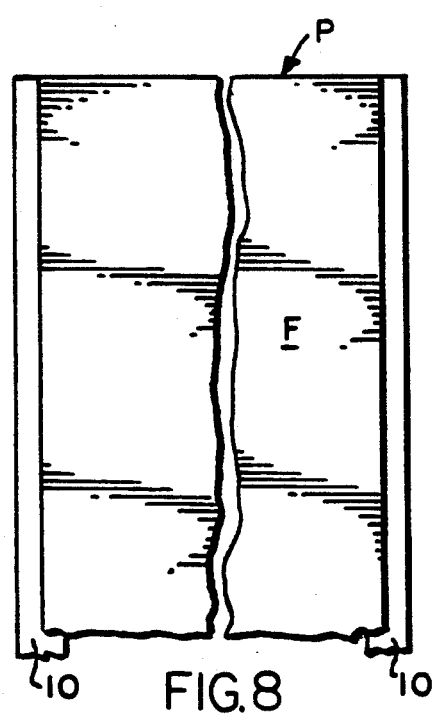
FIG. 8 is a fragmentary schematic view showing one form of the plastic protected board applied to studding.
Figure 9:
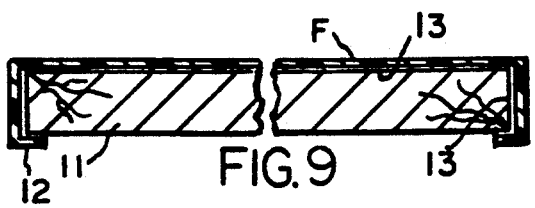
FIG. 9 is a greatly enlarged transverse sectional view thereof.

Referring now more particularly to the accompanying drawings, and in the first instance to FIGS. 8 and 9, I have shown a typical panel board, generally designated P, attached to studs 10, either adhesively or by utilizing galvanized nails. The panel siding P, formed according to the instant invention, comprises a core 11 of cured and dried wood which in FIG. 9 is covered by a plastic covering or film generally designated F. The plastic film F may be adhesively secured to the faces, sides, and ends of the core 11 as at 13. While I have chosen to illustrate a panel type siding P, it is to be understood that any other exterior board siding, such as edge lapped siding, could have been shown and is within the scope of the invention. For the sake of convenience of illustration, the adhesive which may be used has not been depicted in the views which illustrate the molding press.

FIGS. 1-5 schematically depict a differential pressure forming press generally designated 14, which may comprise four spaced apart, vertical, corner frame post members 15, connected in any suitable manner by suitable side and end brace frame structure. Provided at the upper end of the frame posts 15, on angle members 16 which span the corner posts 15, is an upper clamp box assembly, generally designated 17. This assembly includes a top wall 18, side walls 19, and end walls 20, all of which form a substantially air tight heating chamber 17a when closed from the bottom, in a manner to be described. Provided within the interior 21 of the clamp box frame 17 are commercially available electrically energized quartz heaters 22 which may be supported on suitable hanger members 23 from the top wall 18.

Figure 2:
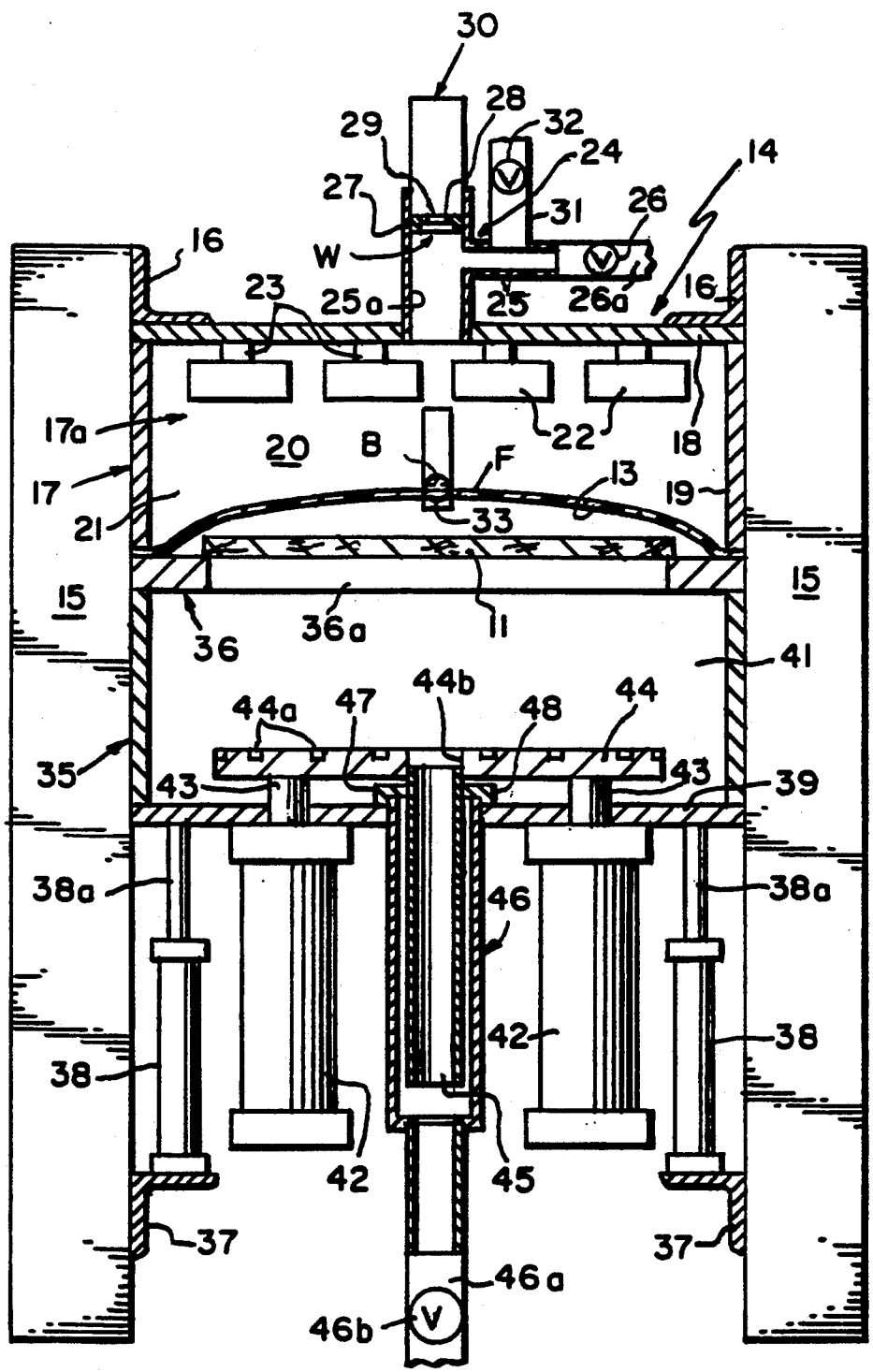
FIG. 2 is a similar view in which the lower clamp box is shown in raised position to clamp the edges of the plastic film to the upper clamp box, and the plastic film is shown raised to an upwardly billowed condition for heating.

The upper wall 18 of the clamp box assembly 17 also admits a sealed housing, generally designated 24, which includes an elbow 25 connected with a vertical tube 25a and leading through a conventional solenoid-opened and closed, spring-returned control valve 26 to a conduit 26a which is connected to a source of regulated air under pressure, such-as a commercially available compressor tank. At its upper end, the housing 24 mounts a sealed window, generally designated W, comprising an outer metallic ring 27 having an opening 28 in which a sight glass 29 is mounted and sealed. The sight glass 29 is fixed in the opening 28 with a high temperature adhesive. Above the ring 27 is a commercially available infra-red pyrometer 30 which is capable of seeing through the special high lead glass 29 and sensing the degree of heat induced by heaters 22 in the plastic film F which has been billowed upwardly as shown in FIG. 2 to prevent its sagging. The pyrometer 30 is sensitive to infra-red radiation given off by the film F and, as will become apparent, is effective through contacts P-1 in the press control circuit (FIG. 13), to which it electrically connects, to shut off the quartz heaters 22 when the film F has reached the desired temperature.

Figure 1:
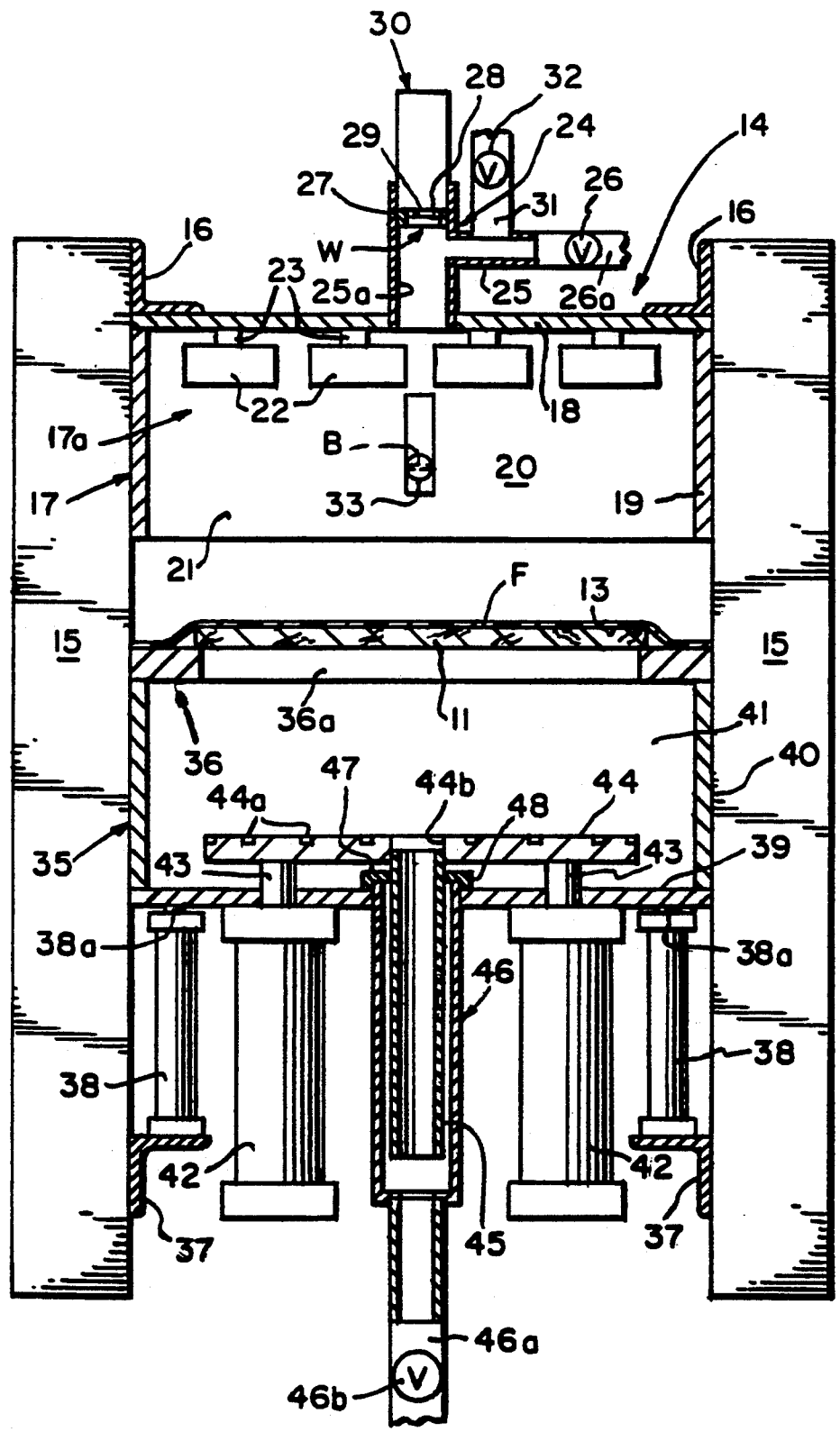

Also communicating with elbow 25, upstream of valve 26, is a vacuum pipe 31 leading through a like solenoid-opened and closed control valve 32 to a suitable suction source such as a conventional vacuum pump. Many types of vacuum pumps are available, such as that shown in U.S. Pat. No. 5,018,947. The film F is exposed to vacuum at the time the quartz heaters 22 begin to heat it, to billow it upwardly from the position in which it is shown in FIG. 1 to the position in which it is shown in FIG. 2 and multi-directionally orient it. The limited degree of billow of the film F is controlled so that no undue stretching or thinning of the thin film F results from the billowing which occurs. Provided in the ends 20 of the clamp box assembly 17 are sealed glass windows W and mounted exteriorly on end plates 20 are a photocell eye 33 on one end and a photocell reflector on the other. When the film F has been billowed upwardly sufficiently to break the electric eye beam B, the vacuum draw exerted through the housing 24 is closed off via the solenoid operated valve 32. When the film F drops sufficiently to clear the beam B, the valve 32 opens to again assert vacuum to restore it. Thus, the vacuum is asserted in pulses to substantially maintain the billowed position of the film F, while it is being heated to molding temperature.

Provided between the upper clamp box assembly 17 and an upwardly movable, lower clamp box assembly 35 is an intermediate clamp frame or work supporting sub-frame, generally designated 36, which has a rectilinear central opening 36a over which the plastic film F is draped. The opening 36a is sized such that it will support the siding board or panel P which is placed on it during loading of the press 14 in the initial steps of the operation.

The lower clamp box assembly 35 is shown as supported from the press frame members 15 on angle support members 37 which utilize double-acting air or hydraulic cylinders 38 which have their piston rods 38a connected to the lower wall 39 of the lower clamp box 35. The clamp box 35 also includes side walls 40 and end walls 41. Plainly, the cylinders 38 may be extended to raise the lower clamp box 35, and the clamp frame 36 which is supported thereon, into engagement with the upper clamp box 17 as shown in FIG. 2.

Figure 3:
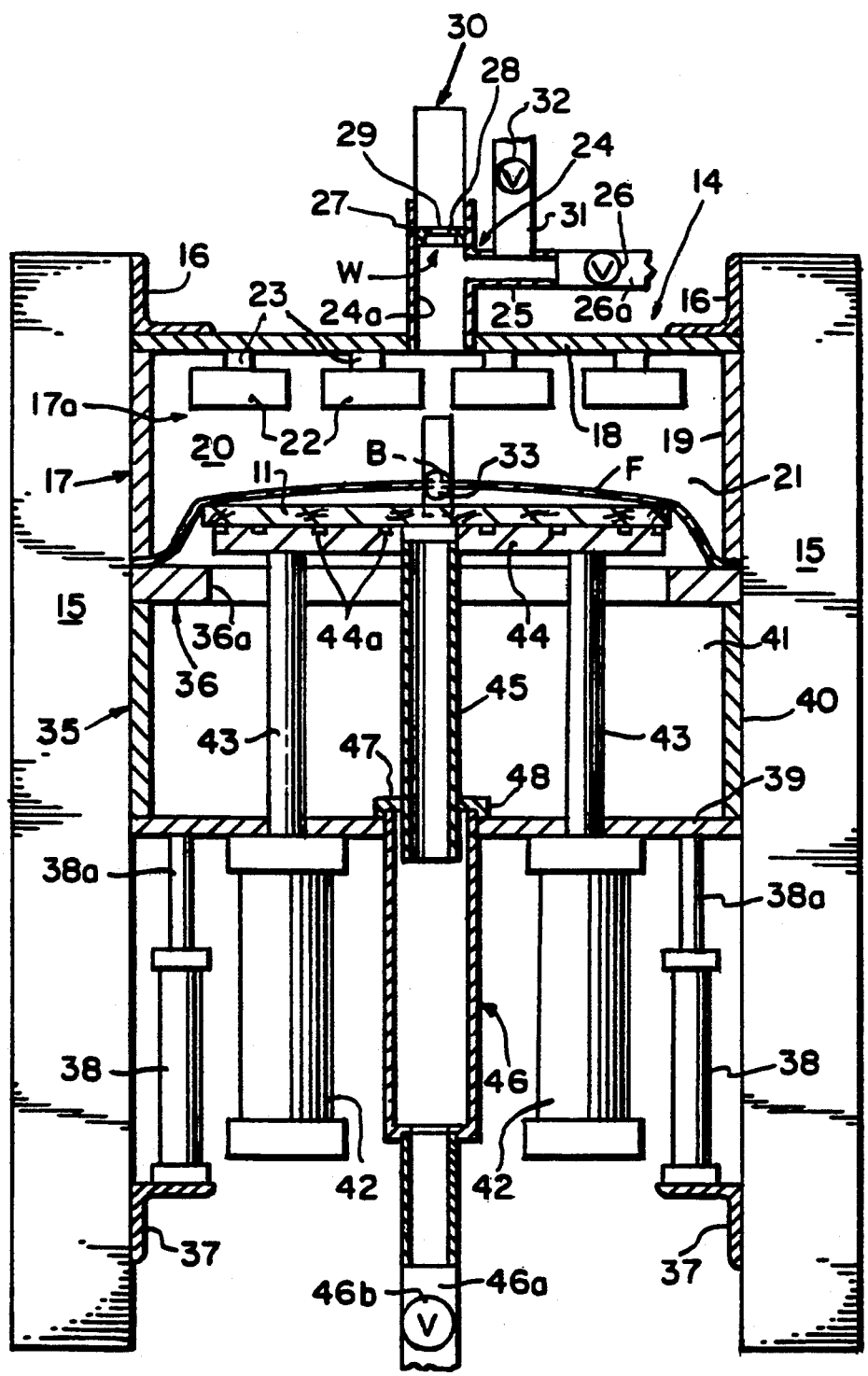
FIG. 3 is a similar view in which the heating of the plastic film has been accomplished to the desired degree and a vacuum asserting platen has been raised to bring the siding or board into contact with the billowed plastic sheet.
Figure 4:
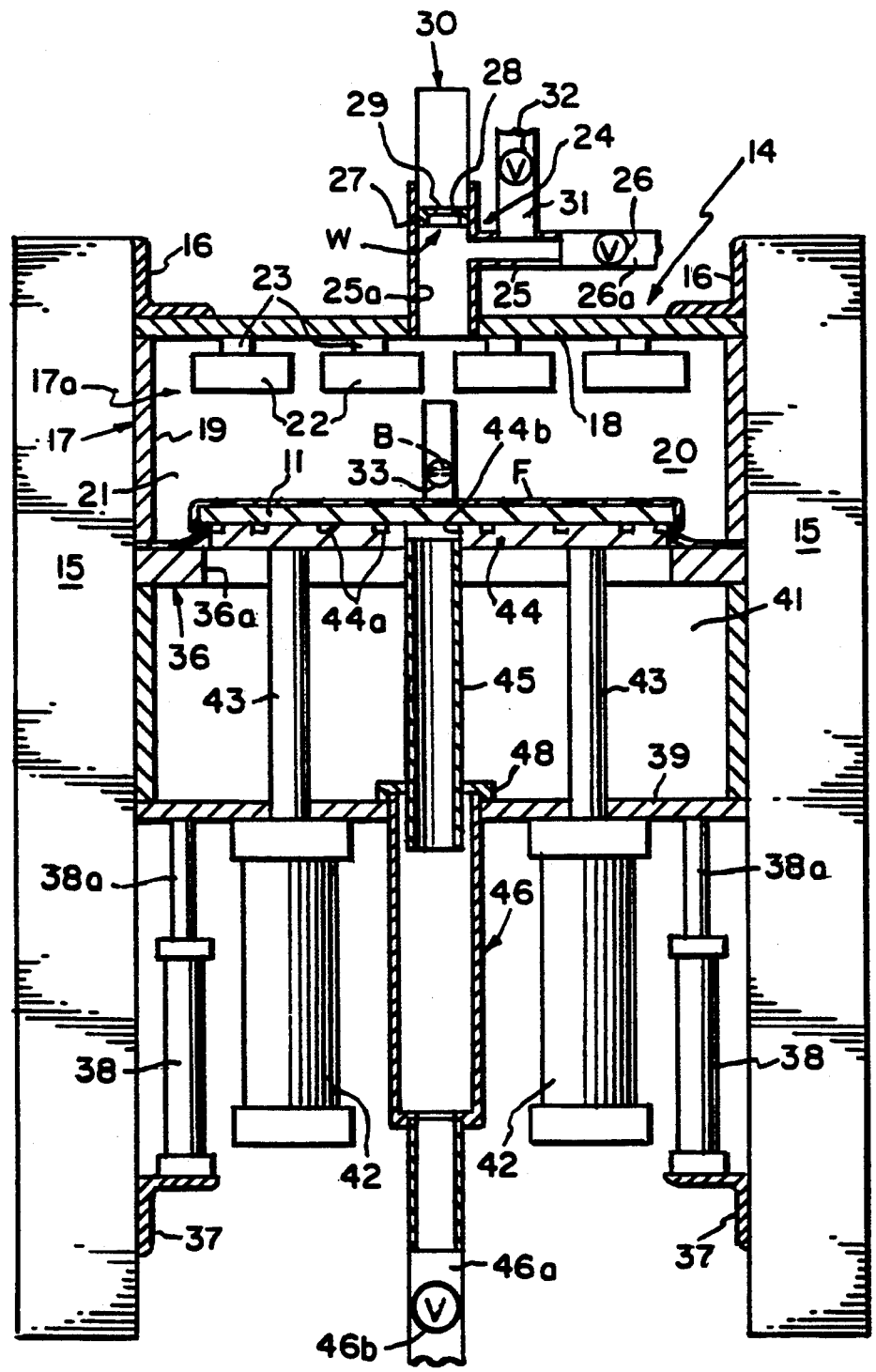
FIG. 4 is a similar view in which differential pressure has been employed to draw the heated plastic film down on the siding into intimate contact with its upper face and side and end edges.

The bottom member 39 of the lower clamp box 35 supports a pair of double-acting air or hydraulic cylinders 42 which have their piston rods 43 connected to a platen 44 which is of such size that it can be raised up through the opening 36a in the frame 36, as shown in FIG. 3. The platen 44 has a downwardly protruding, open ended, tubular member 45 received telescopically within a housing, generally designated 46, which connects at its lower end through a conduit 46a to a source of vacuum under pressure through a solenoid-opened and closed valve 46b. The tube 45 is tightly sealed for sliding movement by a seal ring 47 secured to the lower plate 39 by a metal ring 48.

The plastic film F can be any one of a variety of suitable moisture- resistant and weather-proof thermoplastic films which are moldable, and available in the marketplace. For example, the film F may be a polyvinyl chloride or a modified acrylonitrile butydiene-styrene film, or may be the modified polymethyacrylate film marketed by E.I. DuPont and Nemours Company under the trademark TEDLAR. It typically will have a thickness in the range of 1-10 thousandths of an inch, and the ability to elongate or stretch in all directions to a degree permitting it to expand and contract with the wood core 11 with changes in temperature once the panel siding is installed. The exterior siding board or panel board cores 11 which are loaded to the differential pressure forming press may be formed of hardboard, plywood, laminated wood composite board and other rigid board products.

Referring now more particularly to FIG. 9 in particular, the panel P has the film F very tightly drawn on the core 11 such as to cause the film F to assume the configuration of the grain of the core 11. The back face of the core is covered perimetrally by a portion 12 of the film F and a considerable adherence of the film to the core 11 is effected in this manner. To augment this adherence of the film F to the core 11, a layer of heat activated adhesive 13 may be coated on appropriate surfaces of the core 11. Typical of polymer adhesives which may be employed is the polyurethane adhesive manufactured by B. F. Goodrich Company of Akron, Ohio. Such B-staged adhesives will become tacky and bond the film F to the core 11 when heated during the formation of the panel P. Alternatively, the adhesive could be bonded to one face of the film used.

Figure 7:
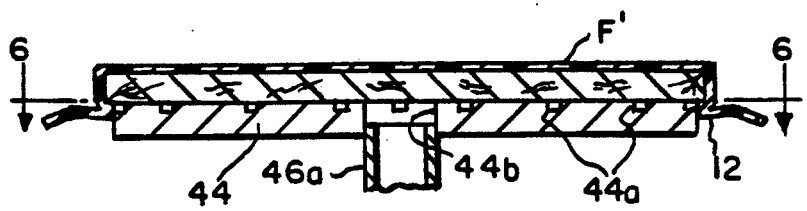
FIG. 7 is a fragmentary, sectional elevational view showing one of the final steps in the process in which thermobonded plastic films completely envelop the product.

Provided in the upper face of platen 44 are a series of vacuum channels 44a connected with a central vacuum opening 44b which communicates with the tube 45. The channels 44a are open to the sides and ends of the platen 44. When the platen 44 has been moved upwardly into engagement with the bottom of panel core 11 and raised it up off frame 36, as shown in FIG. 3, suction asserted via the channels 44a will be exerted through porous cores 11 such as cedar siding cores, and around the edges of such cores and non-porous cores. The portions 12 of film F (FIGS. 7 and 9) are drawn around the underside of the core 11 in this manner.

Figure 13:
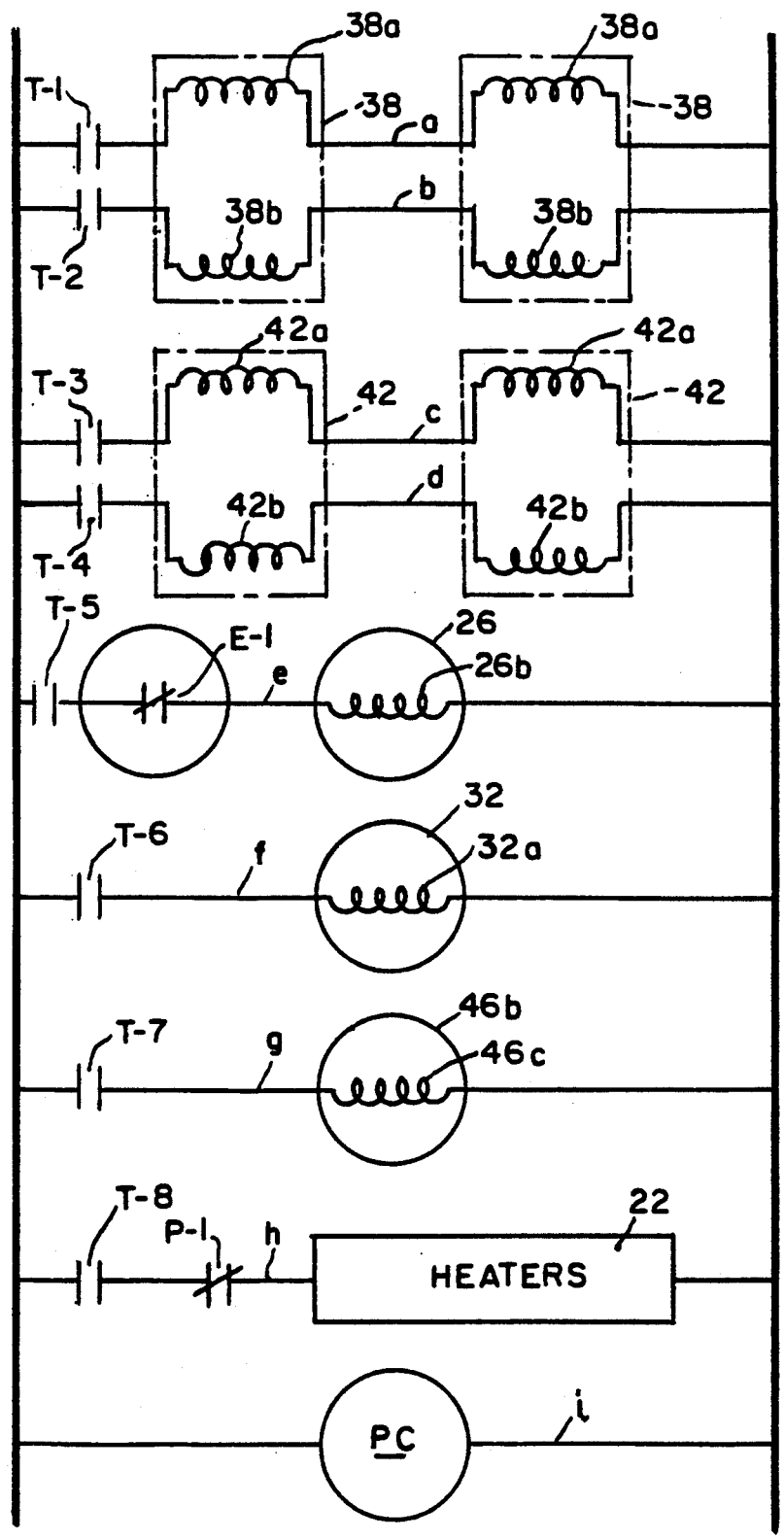
FIG. 13 is a typical schematic electrical control diagram.

In FIG. 13, I have shown a typical schematic control diagram wherein the advance and retract solenoids 38a and 38b of the cylinders 38 are shown in circuit lines a and b. The advance and retract solenoids 42a and 42b of cylinders 42 are shown in circuit lines c and d. The solenoid 26b for valve 26 which controls the admittance of air under pressure to the upper clamp box 17 is disposed in circuit line e and the solenoid 32a for valve 32 which controls communication of a source of vacuum with the upper clamp box 17 is shown in circuit line f. The solenoid 46c for valve 46b for admitting vacuum through the lower vacuum line 46a is shown in the circuit line g, and the quartz heaters 22 are shown in a circuit line h along with the normally closed pyrometer contacts P-1. All of the valves 26, 32 3-18 and 46b may be conventional, solenoid-operated valves which are spring returned to normal closed position. The operation of the circuit is controlled by a conventional, commercially available programmable controller PC in circuit line i which energizes the various circuits a-h in properly timed relation via the schematic contacts T-1 through T-8 in circuit lines a-h respectively. Electric eye contacts E-1 are also in circuit line e in series with the valve 26 solenoid 26b. When a start button is energized, after the core 11 and film F have been loaded to the press, to start the cycle, the lower clamp box 35 is raised with energization of solenoids 38a. Then, the heaters 22 are energized and the plastic film F is billowed upwardly by energizing valve solenoid 26b with the electric solenoid eye contacts E-1 normally closed. Thereafter, the heaters 22 are turned off when the pyrometer contacts P-1 indicate that the billowed film F has been heated to the desired degree in chamber 17a. This initiates energization of the advance solenoids 42a and cylinders 42 to raise platen 44. Shortly after that, the valve solenoid 46c of valve 46b is energized, as is the solenoid 32a of valve 32, and valves 46b and 32 respectively open to assert the vacuum draw and air pressure respectively and mold the plastic film F to the core 11. Finally, the retract solenoids 42b of the cylinders 42 and retract cylinders 38b of the cylinders 38 are energized to restore the platen 44, clamp box 35, and clamp frame 36 to original position for cooling and then unloading. The controller PC keeps the various circuits energized for the requisite time to perform their functions and then de-energizes the circuits.

GENERAL OPERATION

In FIG. 1, the upper and lower clamp box assemblies 17 and 35 are shown in a withdrawn position in which the core 11 has been loaded to the clamp frame 36 and a plastic film F has been draped thereover. The core 11 laps the side and end edges of the opening 36a. Typically, the clamp frame 36 will be loaded and the plastic film draped before being loaded to the press 14, and the edges of the draped plastic will be pre-clamped in position by the clamp frame 36. Such a frame is not required, however, and is not illustrated in the schematic drawings.

In FIG. 2, the cylinders 38 have been activated to move the lower clamp box assembly 35 upwardly and clamp the edges of the plastic film F between the upper side and end surfaces of the intermediate rectilinear clamp frame 36 and the lower edges of the sides and ends 19 and 20, respectively, of the upper clamp box frame 17. In this position of the components the clamp boxes 17 and 35 are substantially air sealed and the vacuum draw asserted through the housing 24 via the opening of valve 32 billows the heating plastic film F upwardly in the manner shown in FIG. 2. When the film F billows upwardly to the point it is sensed by the electric eye 33, the solenoid energized valve 32 is closed by contacts E-1. The vacuum draw asserted essentially holds the billowed film F in the position shown in FIG. 2 during the time that the quartz heaters 22 are energized to completely heat the plastic film F to the predetermined temperature. Because heating is accomplished in a closed vacuum chamber vertically adjacent the core and the thin plastic film F need not be preheated prior to loading it to the molding station, problems which might arise from overheating or molding at too low a temperature are avoided. Typically, for polyvinyl chloride film, the film F will be heated by the temperature in the heated chamber 17a to a moldable temperature in the neighborhood of 300° F. When ABS film is being used, the molding temperature typically will be in the neighborhood of 310° F.

In FIG. 3, the platen 44 is shown as having been raised up by the cylinders 42 through the window 36a in the intermediate clamp frame 36 into engagement with the lower surface of core 11 to raise it off the intermediate clamp frame 36 into engagement with the billowed plastic film F. At this time, valve 46b opens and a vacuum draw is asserted via the vacuum channels 44a to draw the plastic film F tightly down upon and around the side and end edges of core 11. It will also be tightly drawn around the perpimetral edge portions of the lower face as shown at 12 in FIG. 7 because platen 44 is of less dimension in width and length than the core 11. At the same time a suction draw is exerted, air under pressure is supplied through the elbow 25, with opening of valve 26, to assist in assuring adequate intimate contact (FIG. 4) between the film F and the core 11 to provide the high definition product desired wherein the film on the exposed face takes on the configuration of the grain. Trimming takes place after removal of the product in a manner to leave backside flanges 12.

Figure 5:
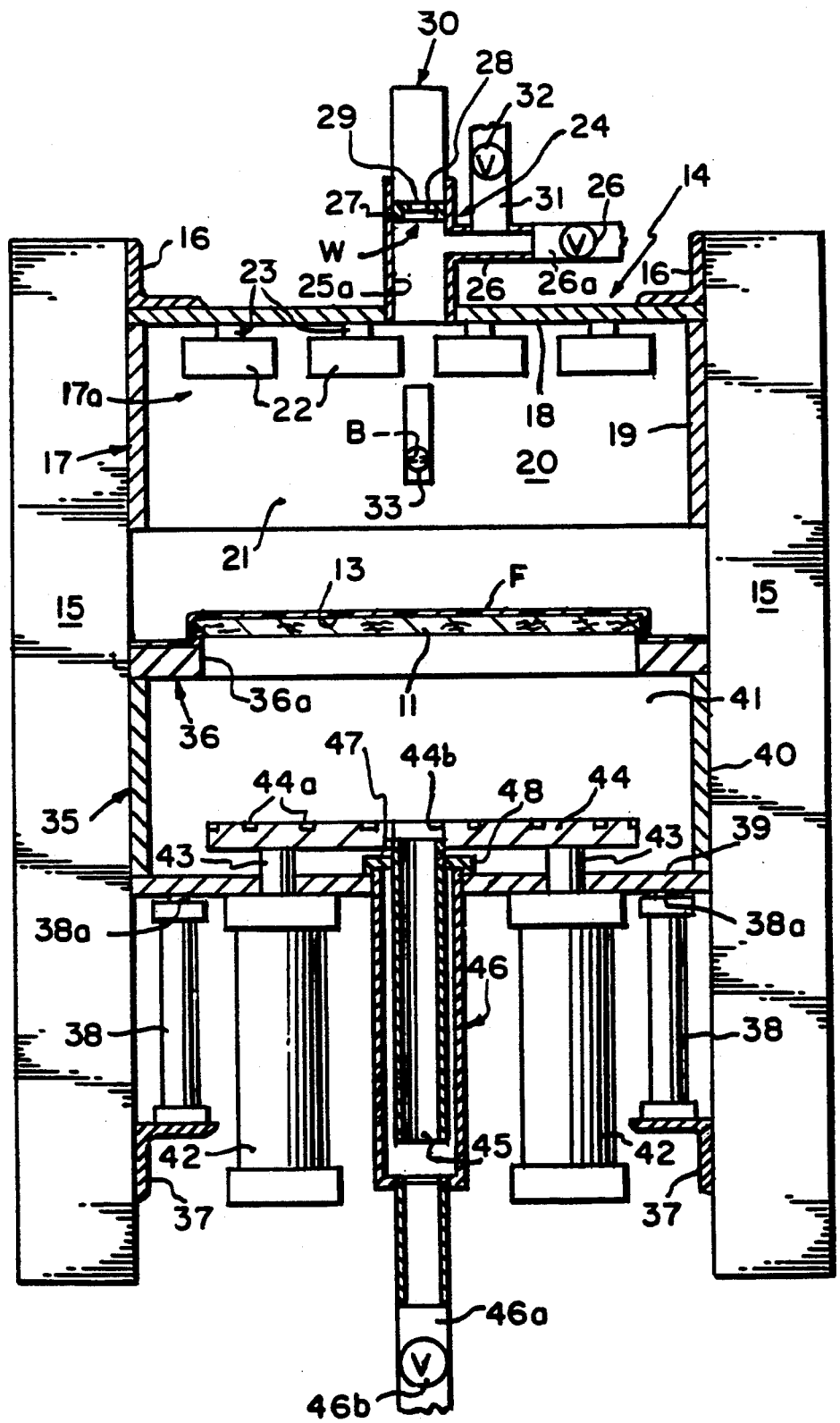
FIG. 5 is a similar view in which the lower clamp box and platen have been withdrawn and the plastic covered board is cooling.
Figure 6:
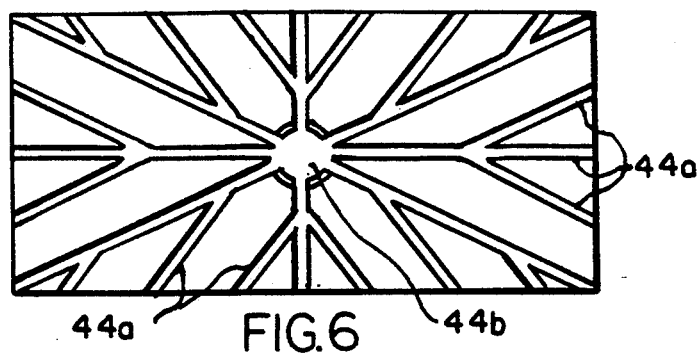
FIG. 6 is an enlarged top plan view of the platen only, taken on the line 6—6 of FIG. 7.

In FIG. 5, the lower clamp box assembly 35 is shown in lowered position, as is the platen 44, and the formed product is shown as cooling in the press, prior to removal. After cooling, the core is removed and the film F is trimmed to leave the product shown in FIG. 9.

Figure 10:
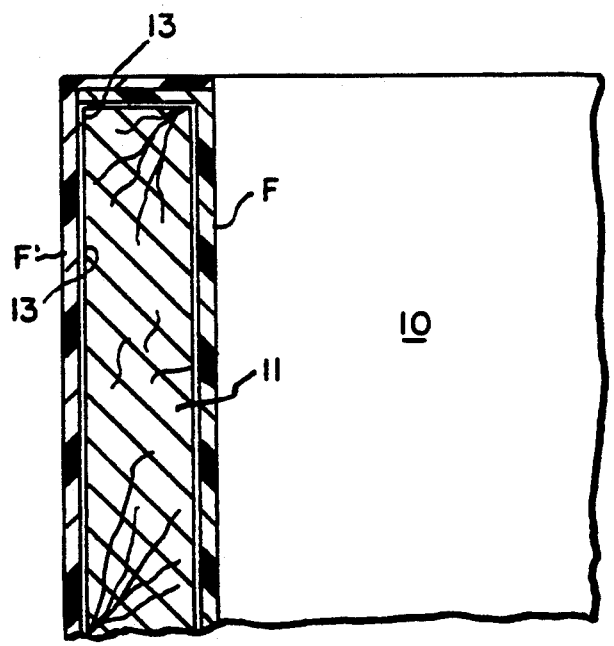
FIG. 10 is a sectional elevational view through a second form of plastic-enveloped board or siding product.
Figure 11:
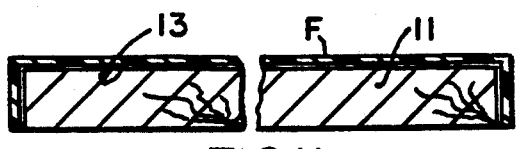
FIG. 11 is a sectional elevational view of the board only showing the initial plastic film molded to the second product.
Figure 12:
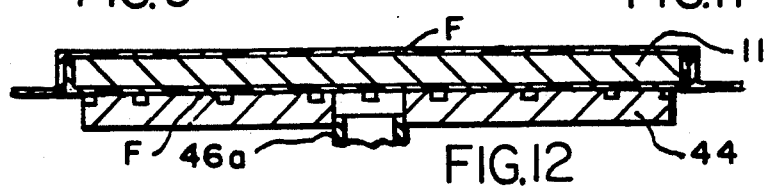
FIG. 12 is a view similar to FIG. 11 showing the board of FIG. 10 in the process of being enveloped.

To fabricate the completely enveloped product illustrated in FIG. 10, the product is formed in the manner indicated in FIGS. 11 and 12. In operation, the core 11 may be supported on the platen 44 from the outset, the stroke of platen 44 being adjusted so it initially is in a first raised position received within the opening 36a to support core 11 throughout the forming operation. When so used, when either of the products of FIG. 9 or 10 are being fabricated, platen 44 forms part of the intermediate board-supporting frame system. As previously, the platen 44 is operated to lift core above the frame 36 just prior to the molding operation. After forming in the manner previously described, the product formed with film F is trimmed to leave only the sides and ends shown in FIG. 11. The product of FIG. 11 will then be loaded to the platen 44 and intermediate clamp frame 36 with its plastic film face F reversed or downward.

Then a second plastic film F' (FIG. 12) is draped over the product of FIG. 11. The second plastic film F', as previously, has sides and ends which extend sufficiently to cover the side and end edges of the core 11 after being molded to the configuration thereof.

At this point, the steps performed in the press 14 are repeated with the product of FIG. 11. The lower clamp box 35 is moved upwardly by the cylinders 38 to clamp the second film F' between the intermediate clamp frame 36 and the lower side and end edges of clamp box 17. When this has occurred, valve 26 is opened to assert the vacuum to billow the second plastic film F' upwardly at the same time heaters 22 are energized to heat the second plastic film F' to the required moldable temperature. When electric eye beam B is interrupted by the billowed film, valve 26 closes, but pulses to maintain the film F' billowed as the film F' continues to be heated until the pyrometer 30 senses that the required temperature has been reached and, via contacts P-1, turns off the electrically energized heaters 22. At this time, the cylinders 42 may be energized to move the platen 44 to lift core 11 above frame 36, and valve 26 is opened to admit air under pressure to the housing 24 and upper clamp box 17. At the same time, valve 46b is opened to assert vacuum forces which will tend to draw the plastic film F' tightly to the side and end edges of the core 11 in the manner shown in FIG. 12. Once the second film sheet F' is drawn down on the product of FIG. 11, in the manner indicated in FIG. 12, the retract solenoids 42b of cylinders 42 are energized to withdraw the platen 44, and the retract solenoids 38b of cylinders 38 are energized to retract the lower clamp box 35 to permit cooling of the product and its removal. The film F' is molded to the upper face, and film F-covered side and end edges of the core, to which it thermally bonds in the manner indicated in FIG. 12. After cooling and trimming the product is in the configuration shown in FIG. 11. While this thermal bonding of the lapped side and end edges of films F and F' creates a well sealed bond, the bond may be augmented with an adhesive as previously. The adhesive may be coated on the upper face and side and end edges of board 11 to bond the film F to core 11 as shown in FIG. 11. When film F' is to be applied, a coating of adhesive is provided on only the then uppermost face of the core 11.

Although preferred embodiments of the invention have been illustrated in the accompanying drawings and described in the foregoing detailed description, it will be understood that the invention is not limited to the embodiments disclosed, but is capable of numerous rearrangements, modifications and substitutions of steps, parts and elements without departing from the spirit of the invention which is defined in the following claims.

What is claimed is:

1. Apparatus for forming a synthetic plastic film protected, external building siding, comprising:
   a. a molding press having a frame with an upper heating chamber box which is open at its lower end and is associated with a heater system;
   b. an intermediate frame for supporting a siding core which spans the opening and has a plastic film draped thereon, the intermediate frame having a central opening therethrough and being mounted for vertical movement with respect to said upper box to close off the lower end of said upper box with said film;
   c. a lower platen mounted for relative vertical movement with said intermediate frame up through the opening in said intermediate frame to engage the under surface of the core carried by said intermediate frame; the platen having vacuum passages in its upper face;
   d. means for energizing said heater system and applying a vacuum to said heating chamber box to billow the film upwardly from the core;
   e. a sensor for indicating when said film reaches molding temperature and deenergizing said heater system;
   f. mechanism communicating with said upper heating chamber box for applying air under pressure to said upper heating chamber box when said sensor indicates said film has reached molding temperature, and for substantially simultaneously applying vacuum to said platen vacuum passages to mold said film to the core; and
   g. mechanism for vertically moving said platen.

2. The apparatus defined in claim 1 wherein said sensor comprises a pyrometer, mounted proximally to the heating chamber box, which senses the temperature of the plastic film closing off the lower end of said heating chamber box.

3. The apparatus defined in claim 1 wherein a further sensor discommunicates said source of vacuum with said heating chamber when said film reaches a predetermined upwardly billowed condition.

4. The apparatus defined in claim 3 wherein said sensing mechanism comprises an electric eye circuit.

5. The apparatus defined in claim 1 wherein said vacuum passages in the upper face of said platen are open to the side and end edges of the platen and said platen is raised sufficiently by said mechanism for vertically moving said platen to lift the core above the intermediate frame.

6. Apparatus for forming a synthetic plastic film-protected external siding board comprising:
   a. a frame;
   b. a molding assembly carried by said frame and comprising an upper, heating chamber box which is open at its lower end and has a heater associated therewith;
   c. said assembly also including a subframe beneath said box for supporting a board core with a plastic film draped thereover to extend beyond the side and end edges of said core and close off the lower end of said upper box with said film;

d. said assembly further including a device for applying a differential pressure to billow said film into said upper box while applying heat to said film until it reaches molding temperature;
e. said assembly incorporating a device for then applying a differential pressure to said heated film to mold it to the core; and
f. mechanism supported by said frame for separating said sub-frame and upper box.

7. The apparatus defined in claim 6 wherein a platen having suction applying passages in its upper surface is mounted for vertical movement on said frame, and elements are provided for moving said platen into engagement with a core supported on said core-supporting frame, and for communicating a vacuum source with said passages when differential pressure is to be applied to mold said film to the core.

8. The apparatus defined in claim 7 wherein said sub-frame has a generally central opening therein, said passages extend through the side and end edges of said platen, and said elements lift the platen through and above said opening in the sub-frame.

9. The apparatus defined in claim 8 wherein a lower clamp box is mounted on said press for travel toward and away from said upper box, and said sub-frame is carried thereby to travel therewith, said mechanism for relatively vertically moving the upper box and sub-frame, and said mechanism for removing them, comprising a first fluid pressure operated cylinder system connected to said lower clamp box, and said elements for moving said platen comprise a second fluid pressure operated cylinder system carried by said lower clamp box and connected to said platen.

* * * * *

UNITED STATES PATENT AND TRADEMARK OFFICE
CERTIFICATE OF CORRECTION

PATENT NO. : 5,324,382
DATED : June 28, 1994
INVENTOR(S) : Robert C. Whiteside

It is certified that error appears in the above-indentified patent and that said Letters Patent is hereby corrected as shown below:

Column 2, line 13, change "Which" to -- which --.

Column 3, line 43, change "such-as" to -- such as --.

Column 7, line 13, change "core" to -- core 11 --.

Column 8, line 50, change "sensing mechanism" to

-- further sensor --.

Signed and Sealed this

Sixth Day of September, 1994

BRUCE LEHMAN

Attest:

*Attesting Officer*    *Commissioner of Patents and Trademarks*